US011540078B1

(12) United States Patent
Seipp et al.

(10) Patent No.: US 11,540,078 B1
(45) Date of Patent: Dec. 27, 2022

(54) SPATIAL AUDIO IN VIDEO CONFERENCE CALLS BASED ON CONTENT TYPE OR PARTICIPANT ROLE

(71) Applicant: Google LLC, Mountain View, CA (US)

(72) Inventors: Karsten Seipp, Stockholm (SE); Jae Pum Park, Bellevue, WA (US); Anton Volkov, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/339,226

(22) Filed: Jun. 4, 2021

(51) Int. Cl.
| | | |
|---|---|---|
| *H04N 7/15* | (2006.01) | |
| *H04S 7/00* | (2006.01) | |
| *H04N 5/60* | (2006.01) | |
| *G06V 20/40* | (2022.01) | |
| *G10L 15/26* | (2006.01) | |
| *G06V 30/10* | (2022.01) | |

(52) U.S. Cl.
CPC .............. *H04S 7/302* (2013.01); *G06V 20/40* (2022.01); *H04N 5/607* (2013.01); *H04N 7/15* (2013.01); *G06V 30/10* (2022.01); *G10L 15/26* (2013.01)

(58) Field of Classification Search
CPC ... H04S 7/00; H04N 7/15; H04N 5/60; G06K 9/00
USPC ........................................... 348/14.01–14.16
See application file for complete search history.

(56) References Cited

U.S. PATENT DOCUMENTS

| | | | |
|---|---|---|---|
| 7,346,654 B1 | 3/2008 | Weiss | |
| 7,974,714 B2 | 7/2011 | Hoffberg | |
| 8,170,193 B2 | 5/2012 | Curry et al. | |
| 8,237,771 B2 | 8/2012 | Kurtz et al. | |
| 8,264,519 B2 | 9/2012 | Lunde et al. | |
| 8,666,047 B2 | 3/2014 | Rambo | |
| 8,681,203 B1 | 3/2014 | Yin et al. | |
| 8,848,028 B2 | 9/2014 | Stedman et al. | |
| 8,994,881 B2 | 3/2015 | Shyu | |
| 9,318,121 B2 | 4/2016 | DaCosta | |

(Continued)

FOREIGN PATENT DOCUMENTS

| | | | | |
|---|---|---|---|---|
| WO | WO-2010120303 A2 | * | 10/2010 | ............. G06Q 10/10 |
| WO | WO-2014010472 A1 | * | 1/2014 | ........... B62D 25/105 |

OTHER PUBLICATIONS

Hyder et al., "Placing the Participants of a Spatial Audio Conference Call", 7th IEEE Consumer Communications and Networking Conference, Jan. 9-12, 2010, Las Vegas, Nevada, 7 pages.

(Continued)

*Primary Examiner* — Melur Ramakrishnaiah (74) *Attorney, Agent, or Firm* — Dority & Manning, P.A.

(57) ABSTRACT

Systems and methods for multi-attendee video conferencing are described. A system can perform spatial audio modulation techniques in video conference calls based on content type or participant role. In particular, by assigning user roles and content types to specific regions in a two- or three-dimensional audio sound space or "soundstage," users can identify—simply by listening—the source of the audio (e.g., who the current speaker is and/or whether the sound came from a specific type of content). Thus, in example implementations of the present disclosure, each of a number of conference roles and/or content types can be allocated a particular virtual location within the audio soundstage.

20 Claims, 7 Drawing Sheets

(56) References Cited

U.S. PATENT DOCUMENTS

| | | |
|---|---|---|
| 9,368,117 B2 | 6/2016 | Liu et al. |
| 9,525,830 B1 * | 12/2016 | Roylance ................ H04L 65/60 |
| 9,998,508 B2 | 6/2018 | Sun et al. |
| 10,026,452 B2 | 7/2018 | Antonellis et al. |
| 10,522,151 B2 | 12/2019 | Cartwright et al. |
| 10,819,969 B2 | 10/2020 | Ostrover et al. |
| 10,924,709 B1 * | 2/2021 | Faulkner ............... G06F 3/0484 |
| 10,986,301 B1 | 4/2021 | Schanz |
| 2006/0238611 A1 | 10/2006 | Kenoyer et al. |
| 2007/0070177 A1 | 3/2007 | Christensen |
| 2010/0238265 A1 * | 9/2010 | White ..................... H04N 7/15 |
| | | 348/E7.08 |
| 2010/0316232 A1 | 12/2010 | Acero et al. |
| 2011/0283008 A1 * | 11/2011 | Smelyansky ............ H04N 7/15 |
| | | 715/753 |
| 2012/0216129 A1 | 8/2012 | Ng et al. |
| 2016/0165184 A1 | 6/2016 | Aaron et al. |
| 2017/0353694 A1 * | 12/2017 | Yoakum .................. G06F 3/165 |
| 2018/0174600 A1 | 6/2018 | Chaudhuri et al. |
| 2018/0341374 A1 * | 11/2018 | Faulkner ............. H04L 65/4015 |
| 2019/0007467 A1 * | 1/2019 | Powell ............... G06Q 10/1095 |
| 2020/0099792 A1 | 3/2020 | Nguyen et al. |
| 2020/0218428 A1 | 7/2020 | Roos |
| 2021/0076105 A1 | 3/2021 | Parmar et al. |

OTHER PUBLICATIONS

Nguyen et al., "MultiView: Spatially Faithful Group Video Conferencing" CHI 2005, Apr. 2-7, 2005, Portland, Orerond, 10 pages.
Invitation to Pay Additional Fees for Application No. PCT/US2022/032040, dated Oct. 11, 2022, 18 pages.

* cited by examiner

SPATIAL AUDIO IN VIDEO CONFERENCE CALLS BASED ON CONTENT TYPE OR PARTICIPANT ROLE

FIELD

The present disclosure relates generally to videoconferencing technology. More particularly, the present disclosure relates to spatial audio in video conference calls based on content type or participant role.

BACKGROUND

Multi-attendee video conferencing systems can provide audiovisual streams to a client device for multiple attendees of a video conference. Often, there are many participants that are participating in a video conference and which may be visualized on a display screen (e.g., visual data from other participants, presented content, shared content, etc.).

However, in existing video conference technologies, the audio portion of each audiovisual stream is consistently placed in the front and center of an audio soundstage associated with the video conference. Regardless of the content type, where the participant on screen may be, or the role of the participant in the conference. This is an unnatural user experience as humans expect spatial differentiation of sound.

As such, participants may struggle to disambiguate the source of an audio stream from the multiple possible sources (e.g., the multiple other participants). This struggle to disambiguate the source of audio within a videoconference can lead to misunderstanding, fatigue, interruption, inability to separate multiple speakers/audio sources, etc. Each of these drawbacks can lead to longer video conferences which can lead to an increased use of computational resources such as processor usage, memory usage, network bandwidth, etc.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for providing spatial audio within a videoconferencing application. The method includes receiving, by a computing system comprising one or more computing devices, a plurality of audiovisual streams respectively associated with a plurality of participants in a video conference, wherein each audiovisual stream comprises audio data and visual data. The method includes, for at least a first audiovisual stream of the plurality of audiovisual streams: determining, by the computing system, a conferencing attribute for the first audiovisual stream, wherein the conferencing attribute is descriptive of one or both of: a content type associated with the first audiovisual stream or a participant role associated with the first audiovisual stream; determining, by the computing system, a first virtual audio location for the first audiovisual stream within an audio soundstage based at least in part on the conferencing attribute; and modifying, by the computing system, the audio data associated with the first audiovisual stream to cause playback of the audio data to have the first virtual audio location within the audio soundstage. The method includes providing, by the computing system, the plurality of audiovisual streams including the first audiovisual stream having the modified audio data for audiovisual playback in the video conference.

Another example aspect of the present disclosure is directed to a computing system that includes one or more processors and one or more non-transitory, computer-readable media that store instructions that when executed by the one or more processors cause the computing system to perform operations. The operations include receiving, by the computing system, a plurality of audiovisual streams respectively associated with a plurality of participants in a video conference, wherein each audiovisual stream comprises audio data and visual data. The operations include for at least a first audiovisual stream of the plurality of audiovisual streams: determining, by the computing system, a conferencing attribute for the first audiovisual stream, wherein the conferencing attribute is descriptive of one or both of: a content type associated with the first audiovisual stream or a participant role associated with the first audiovisual stream; determining, by the computing system, a first virtual audio location for the first audiovisual stream within an audio soundstage based at least in part on the conferencing attribute; and modifying, by the computing system, the audio data associated with the first audiovisual stream to cause playback of the audio data to have the first virtual audio location within the audio soundstage. The operations include providing, by the computing system, the plurality of audiovisual streams including the first audiovisual stream having the modified audio data for audiovisual playback in the video conference.

Another example aspect of the present disclosure is directed to one or more non-transitory computer-readable media that store instructions that, when executed by one or more processors of a computing system, cause the computing system to perform operations to calibrate audio for a participant of a video conference. The operations include causing playback of audio data with an audio playback device while modifying a virtual audio location of the audio data within an audio soundstage. The operations include receiving input data provided by the participant of a video conference during modification of virtual audio location of the audio data within an audio soundstage. The operations include determining, based on the input data provided by the participant of the video conference, a physical location of the participant of the video conference relative to an audio playback device. The operations include using the physical location of the participant of the video conference relative to an audio playback device to modify one or more other audio signals from other participants of the video conference to cause playback of the one or more other audio signals by the audio playback device to have a desired virtual location in an audio soundstage generated for the participant of the video conference during the video conference.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Reference numerals that are repeated across plural figures are intended to identify the same features in various implementations.

DETAILED DESCRIPTION

Example aspects of the present disclosure are directed to systems and methods which perform spatial audio modulation techniques in video conference calls based on content type or participant role. In particular, by assigning user roles and content types to specific regions in a two- or three-dimensional audio sound space or "soundstage," users can identify—simply by listening—the source of the audio (e.g., who the current speaker is and/or whether the sound came from a specific type of content). Thus, in example implementations of the present disclosure, each of a number of conference roles and/or content types can be allocated a particular virtual location within the audio soundstage. Then, audio data from some or all of the sources (e.g., each audiovisual stream included in the video conference) can be modified so that playback of the audio data has the virtual location within the audio soundstage that corresponds to its conference role or content type. In such fashion, participants of the video conference can easily identify and attribute the source of each audio signal included in the video conference.

More particularly, a video conferencing system can receive a plurality of audiovisual streams respectively associated with a plurality of participants in a video conference. Each audiovisual stream can include audio data and visual data. In some implementations, some or all of the participants may be human participants. For example, the visual data can correspond to video that depicts the human participant while the audio data can correspond to audio captured in the environment in which the human participant is located. In some implementations, some of the participants may correspond to content that is being shared among some or all of the other participants. For example, an audiovisual stream can correspond to a shared display or other shared content (e.g., shared by a specific human participant from their device or shared from a third-party source or integration). In another example, one audiovisual stream may correspond to multiple human participants (e.g., multiple humans located in a same room using one set of audiovisual equipment).

In some implementations, an audiovisual stream (e.g., a display stream shared by a participant) may include dynamic visual data while the audio data for the stream is null or blank. In other implementations, an audiovisual stream may include dynamic audio data while the visual data for the stream is null or blank (e.g., as in the case of a human participant who has their video "turned off"). Thus, as used herein, the term audiovisual stream generally refers to defined streams of content which can include audio and/or video. Multiple streams of content may originate from the same device (e.g., as in the case of a user having a first audiovisual stream for their video/audio presence and a second audiovisual stream which shares content from their device to the other participants).

According to an aspect of the present disclosure, for some or all of the audiovisual streams included in a video conference, the video conferencing system can determine a conference attribute for each audiovisual stream. The conference attribute can describe how the audiovisual stream relates to the other audiovisual streams in the video conference and/or characteristics of how the audiovisual stream should be perceived by various conference participants. As examples, the conference attribute determined for each audiovisual stream can describe or correspond to one or both of: a content type associated with the audiovisual stream or a participant role associated with the audiovisual stream.

According to another aspect of the present disclosure, the video conferencing system can determine a virtual audio location for each audiovisual stream within an audio soundstage based at least in part on the conferencing attribute determined for the audiovisual stream. The video conferencing system can modify the audio data associated with each audiovisual stream to cause playback of the audio data to have the virtual audio location within the audio soundstage that was determined for the audiovisual stream. The video conferencing system can then provide the plurality of audiovisual streams having the modified audio data for audiovisual playback in the video conference.

Various techniques can be used to modify the audio data associated with each audiovisual stream to cause playback of the audio data to have the virtual audio location within the audio soundstage that was determined for the audiovisual stream. Example techniques include the use of head related transfer functions, which is a response that characterizes how an ear receives a sound from a point in space. Other example techniques include wave field synthesis, surround sound, reverberation, and/or other three-dimensional positional audio techniques. The audio soundstage can be two-dimensional (e.g., with two dimensions that correspond with the axes of an associated display screen) or the audio soundstage can be three-dimensional (e.g., with an added depth dimension).

Thus, in example implementations of the present disclosure, each of a number of conference roles and/or content types can be allocated a particular virtual location within the audio soundstage. Then, some or all of the audiovisual streams included in the video conference can be assigned to the different conference roles and/or content types. Thereafter, audio data from some or all of the audiovisual streams included in the video conference can be modified so that playback of the audio data from each audiovisual stream has the virtual location within the audio soundstage that corresponds to its conference role or content type. In such fashion, participants of the video conference can easily identify and attribute the source of each audio signal included in the video conference.

The framework described above can be used to effectuate a number of different use-cases or example applications or user experiences. In some examples, the conferencing attribute determined for each audiovisual stream can correspond to or be constrained to be one of a plurality of predefined attribute values.

As one example, the plurality of predefined attribute values can include at least a presentation content type and a presenter participant role. Thus, audio associated with an audiovisual stream that has been determined to be a presentation content type can be modified so as to come from a certain virtual audio location associated with presentation content (e.g., center-left) while audio associated with an audiovisual stream that has been determined to be a presenter participant role can be modified so as to come from a different virtual audio location associated with the presenter (e.g., top-right).

In another example, the plurality of predefined attribute values can include at least a presenter participant role and an audience participant role. Thus, audio associated with an audiovisual stream that has been determined to be a presenter role can be modified so as to come from a certain virtual audio location associated with presenters (e.g., top-center). On the other hand, audio associated with an audiovisual stream that has been determined to be an audience participant role can be modified so as to come from a different virtual audio location associated with the audience (e.g., bottom-center). In some implementations, multiple audiovisual streams can be designated as presenter participant roles (e.g., when a "panel" of presenters is present).

In yet another example, the plurality of predefined attribute values can include at least a primary speaker participant role and a translator participant role. For example, a primary speaker participant role can include a primary group speaker participant role (i.e. panel or fireside chat). Thus, audio associated with an audiovisual stream that has been determined to be a primary speaker role can be modified so as to come from a certain virtual audio location associated with primary speakers (e.g., center-center). On the other hand, audio associated with an audiovisual stream that has been determined to be a translator participant role can be modified so as to come from a different virtual audio location associated with the translator (e.g., bottom-right). In some implementations, multiple audiovisual streams can be designated as primary speaker roles (e.g., when multiple persons are speaking in a common language or in different languages). In some implementations, multiple audiovisual streams can be designated as translator roles (e.g., when multiple persons are translating into different languages). Multiple translators may be located at different virtual audio locations.

In another example, the plurality of predefined attribute values can include at least a captioned content type and a non-captioned content type. Thus, audio associated with an audiovisual stream that has been determined to be non-captioned audio can be left unmodified so as to come from the location that such audio would have otherwise been located. On the other hand, audio associated with an audiovisual stream that has been determined to be captioned audio can be modified so as to come from a particular virtual audio location associated with captioned audio (e.g., bottom-center). For example, audio can be determined to correspond to captioned audio based on internal conference settings or parameters and/or based on a comparison of text generated from the audio to the captioned text.

As another example, in some implementations, the conferencing attribute can be descriptive of an assignment of the audiovisual stream to one of a plurality of different groupings of the plurality of audiovisual streams. For example, each audiovisual stream can be assigned (e.g., automatically and/or by a participant or moderator) to one of a number of different groups. Each group may be assigned a different virtual audio location in the audio soundstage. Then, the audio from any audiovisual stream can be modified so as to come from the virtual audio location assigned to the group in which the audiovisual stream is currently assigned/included. In such fashion, breakout rooms or multiple sub-meetings can occur within the same video conference, while different virtual audio locations are used to enable participants to distinguish among the audio (e.g., conversations) occurring in each sub-meeting. This example use may facilitate interactive events such as network events or casual get-togethers to occur in the same video conference, with users being able to move in and among different sub-meetings to join different discussions or conversations.

In some implementations, the conferencing attributes for the audiovisual streams (e.g., the content types or participant roles) may be preassigned and static (e.g., do not change over the course of the video conference). In other implementations, the conferencing attributes may be dynamic (e.g., change over the course of the video conference). For example, roles can be changed by a moderator or can change automatically based on an automatic determination or analysis.

In some implementations, the respective conferencing attributes for the audiovisual streams may be manually controllable. For example, a moderator can control/assign the conferencing attributes for the audiovisual streams so that they are the same for all participants of the video conference (e.g., each video conference participant is receiving the same audio experience). In another example, each conference participant may be able to assign the conferencing attributes for the audiovisual streams as played back at their own device (e.g., each video conference participant can have their own different and individually-controllable audio experience).

In some implementations, the respective conferencing attributes for the audiovisual streams may be automatically determined. For example, various algorithms or heuristics can be used to automatically determine one or more conferencing attributes for each audiovisual stream. As one example, the video conferencing system can recognize text in visual data included in one of the audiovisual streams; perform speech-to-text to generate text from audio data included in another of the audiovisual streams; and identify the another of the audiovisual streams as a presenter participant role when the text generated from audio data matches the text in the visual data. Stated differently, the video conference system can use various tools such as speech-to-text tools, optical character recognition (OCR) tools, etc. to detect when a certain audiovisual stream is giving a presentation of content presented in a different audiovisual stream. In another example, various machine learning techniques such as artificial neural networks can be used to automatically determine respective conferencing attributes for the audiovisual streams. For example, machine learning models can be trained using supervised techniques applied to training data collected from manual assignment of respective conferencing attributes to the audiovisual streams. In another example, the models can train themselves using unsupervised techniques, such as observing and self-evaluating meeting dynamics.

In some implementations, the conference attribute for the first audiovisual stream can be assigned or defined within a calendar invitation associated with the video conference. For example, a creator of the calendar invitation may be able to assign the conference attributes to invited attendees within the calendar invitation. Other attendees may or may not have the ability to modify or request modifications to the conference attributes (e.g., depending upon selected settings).

In some implementations, the conferencing attributes which are available for use (e.g., the predefined attribute values) can be associated with and a function of a predefined template layout or theme selected for the video conference. For example, a number of template layouts can be predefined. Each template layout may have a number of predefined conferencing attribute values which are associated with the template layout. Audiovisual streams included in the video conference can be assigned to fill the different predefined attribute values included in the layout. As an example, a layout may correspond to a panel of five presenter roles and a group audience role. Five of the audiovisual streams may be assigned to the five panel positions and all other audiovisual streams placed associated to the group audience role. Example templates may have corresponding visual locations, visual appearance modifications (e.g., a virtual "photo-stand-in" cutout, virtual picture frames, virtual backgrounds etc.), timing characteristics, group shuffling characteristics, or other characteristics.

In some implementations, audio data associated with an audiovisual stream may be assigned to multiple different virtual audio locations. For example, for certain conferencing attributes, multiple virtual audio locations can be assigned. As one example, an example conferencing role may correspond to demonstration or teaching of a musical instrument. In such instance, audio data from the audiovisual stream that corresponds to speech can be modified to come from a first virtual audio location (e.g., top-right) while audio data from the same audiovisual stream that corresponds to music can be modified to come from a second virtual audio location (e.g., center-center). Thus, in this and other examples, a video conferencing system can perform source separation on the audio data associated with an audiovisual stream to separate the audio data into first source audio data from a first audio source and second source audio data from a second audio source. The first source audio data and the second source audio can be modified to come from different virtual audio locations. For example, source separation can be performed based on frequency-domain analysis.

In some example implementations, the virtual audio location associated with the audio data of an audiovisual stream may be correlated with the video location of the visual data of the audiovisual stream. For example, the video of a presenter may appear in a top-right of a participant's display screen while the corresponding audio is located in the top-right of the soundstage. However, in other implementations, the virtual audio location associated with the audio data of an audiovisual stream may be decorrelated with the video location of the visual data of the audiovisual stream. For example, the audio of a certain audiovisual stream may be moved around the soundstage, regardless of where the corresponding video is located on display screen(s).

The techniques described in the present disclosure (e.g., those attributed generally to a video conference system) can be performed at various different devices. As one example, the techniques described herein (e.g., determination of conferencing attribute(s) and resulting modification of audio data) can be performed at a server computing system that is facilitating the video conference. For example, this scenario may be advantageous when the audio modifications are consistent/uniform for all participants. As another example, the techniques described herein (e.g., determination of conferencing attribute(s) and resulting modification of audio data) can be performed at a client computing device (e.g., a device associated with one of the participants). For example, this scenario may be advantageous when the audio modifications are inconsistent and different for different participants, or when the user activates an 'accessibility mode' that distributes the sound sources on the soundstage in a manner that facilitates their comprehension, even when visual cues are not available. In one example, modification of audio data can be performed on a client computing device via a plug-in or other computer-readable code executed by a browser application executing a video conferencing web application. In another example, client-side operations can be performed in a dedicated video conferencing application.

Another example aspect of the present disclosure is directed to techniques to calibrate audio for a participant of a video conference. In particular, in one example, to calibrate audio for the participant, the video conferencing system can cause playback of audio data with an audio playback device while modifying a virtual audio location of the audio data within an audio soundstage. The system can receive input data provided by the participant of a video conference during modification of virtual audio location of the audio data within an audio soundstage and determine, based on the input data provided by the participant of the video conference, a physical location of the participant of the video conference relative to an audio playback device. The system can use the physical location of the participant of the video conference relative to an audio playback device to modify one or more other audio signals from other participants of the video conference to cause playback of the one or more other audio signals by the audio playback device to have a desired virtual location in an audio soundstage generated for the participant of the video conference during the video conference.

The present disclosure provides a number of technical effects and benefits. As one example technical effect and benefit, the systems and methods of the present disclosure enable improved audio understanding by participants in a multi-attendee video conferencing. More particularly, the present disclosure modifies audio data from some or all of the sources (e.g., each audiovisual stream) included in the video conference so that playback of the audio data has a virtual location within the audio soundstage that corresponds to its conference role or content type. In such fashion, participants of the video conference can easily identify and attribute the source of each audio signal included in the video conference. Improved and intuitive understanding of audio source attribution can reduce fatigue and provide a user experience that is more understandable and consistent, which may be particularly advantageous for users with visual impairments.

As another example technical effect, the systems and methods of the present disclosure also result in the conservation of computing resources. In particular, the systems and methods of the present disclosure enable participants of the video conference to identify and attribute each audio signal included in the video conference to a particular source more easily. This can reduce confusion in a video conference, which can reduce the length of the video conference as fewer misunderstandings may need to be clarified. Shorter video conferences can conserve computational resources such as processor usage, memory usage, network bandwidth, etc. Additionally, users may consume a video conference just as 'listeners', where this spatial distribution of audio based on content type, user role, and accessibility-settings may suffice to understand and follow the conference, saving bandwidth through the omission of visual data.

The techniques proposed herein may be of particular assistance to visually impaired users, who may not be able to visually determine the identity of the current speaker or audio source. Thus, as examples, by assigning virtual locations in audio space to user roles and content types, visually impaired users can tell whether a primary presenter or the audience was speaking and/or whether a sound belonged to shared content or an integrated application.

With reference now to the Figures, example embodiments of the present disclosure will be discussed in further detail.

Figure 1:
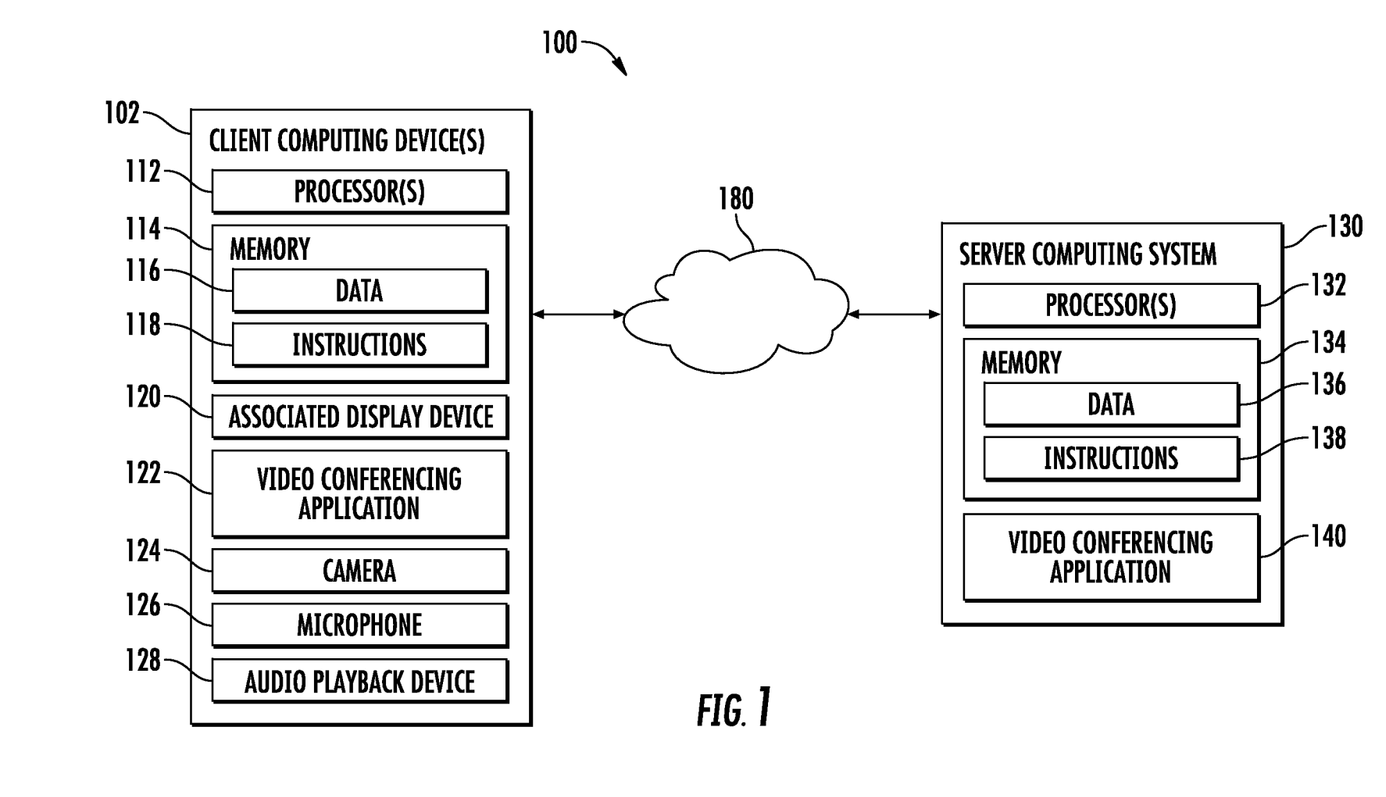
FIG. 1 depicts a block diagram of an example computing system according to example embodiments of the present disclosure.

FIG. 1 depicts an example client-server environment 100 according to example embodiments of the present disclosure. The client-server environment 100 includes a client computing device 102 and a server computing system 130 that are connected by and communicate through a network 180. Although a single client computing device 102 is depicted, any number of client computing devices 102 can be included in the client-server environment 100 and connect to server computing system 130 over a network 180.

In some example embodiments, the client computing device 102 can be any suitable device, including, but not limited to, a smartphone, a tablet, a laptop, a desktop computer, a gaming console, or any other computer device that is configured such that it can allow a user to participate in a video conference. The client computing device 102 can include one or more processor(s) 112, memory 114, an associated display device 120, a video conferencing application 122, a camera 124, a microphone 126, and an audio playback device 128 (e.g., speaker(s) such as stereo speakers).

The one or more processor(s) 112 can be any suitable processing device, such as a microprocessor, microcontroller, integrated circuit, or other suitable processing device. The memory 114 can include any suitable computing system or media, including, but not limited to, non-transitory computer-readable media, RAM, ROM, hard drives, flash drives, or other memory devices. The memory 114 can store information accessible by the one or more processor(s) 112, including instructions that can be executed by the one or more processor(s) 112. The instructions can be any set of instructions that when executed by the one or more processor(s) 112, cause the one or more processor(s) 112 to provide the desired functionality.

In particular, in some devices, memory 114 can store instructions for video conferencing between the client computing device 102 and the server computing device 130 (e.g., one or more video conferencing applications 122, etc.). The client computing device 102 can implement the instructions to execute aspects of the present disclosure, including directing communications with server computing system 130, providing a video conferencing application 122 and/or video stream to a user, scaling a received video stream to a different resolution display region, and/or generating and sending instructions to the server computing system requesting a new video stream for a display region.

It will be appreciated that the term "system" can refer to specialized hardware, computer logic that executes on a more general processor, or some combination thereof. Thus, a system can be implemented in hardware, application specific circuits, firmware, and/or software controlling a general-purpose processor. In one embodiment, the systems can be implemented as program code files stored on a storage device, loaded into memory and executed by a processor or can be provided from computer program products, for example computer executable instructions, that are stored in a tangible computer-readable storage medium such as RAM, hard disk, or optical or magnetic media.

Memory 114 can also include data 116, such as video conferencing data (e.g., captured at the client computing device 102 or received from the server computing system 130), that can be retrieved, manipulated, created, or stored by the one or more processor(s) 112. In some example embodiments, such data can be accessed and displayed to one or more users of the client computing device 102 during a video conference or transmitted to the server computing system 130.

The client computing device 102 can execute a video conferencing application 122. In one example, the video conferencing application 122 is a dedicated, purpose-built video conferencing application. In another example, the video conferencing application 122 is a browser application that executes computer-readable code locally (e.g., by processor(s) 112) to provide a video conference as a web application.

The video conferencing application 122 can capture visual data from a camera 124 and/or a microphone 126 and transmit that data to the server computing system 130. The client computing device 102 can receive, from the server computing system 130, audiovisual data (e.g., audio data and/or visual data) from one or more other participants of the video conference (e.g., other client computing devices 102). The client computing device 102 can then display the received visual data to users of the client computing device 102 on associated display device 120 and/or cause playback of the received audio data to users of the client computing device 102 with the audio playback device 128. In some example embodiments, the camera 124 collects visual data from one or more users. The camera 124 can be any device capable of capturing visual data. The microphone 126 can be any device capable of capturing audio data. In one example, a webcam can serve as both a camera and a microphone.

In accordance with some example embodiments, the server computing system 130 can include one or more processor(s) 132, memory 134, and a video conferencing system 140. The memory 134 can store information accessible by the one or more processor(s) 132, including instructions 138 that can be executed by processor(s) and data 136.

The server computing system 130 can be in communication with one or more client computing device(s) 102 using a network communication device that is not pictured. The network 180 can be any type of communications network, such as a local area network (e.g., intranet), wide area network (e.g., Internet), or some combination thereof. In general, communication between the client computing device 102 and the server computing system 130 can be carried via network interface using any type of wired and/or wireless connection, using a variety of communication protocols (e.g., TCP/IP, HTTP, RTP, RTCP, etc.), encodings or formats (e.g., HTML, XML), and/or protection schemes (e.g., VPN, secure HTTP, SSL).

The server computing system 130 can include a video conferencing system 140. In some implementations, the video conferencing system 140 can be configured to facilitate operation of the video conferencing application 122 executed by one or more client computing devices 102. As an example, the video conferencing system 140 can receive audiovisual streams from a plurality of client computing devices 102 (e.g., via network 180) respectively associated with a plurality of video conference attendees. The video conferencing system 140 can provide the audiovisual streams to each of the client computing devices 102.

The video conferencing application 122 and/or the video conferencing system 140 can operate independently or collaboratively to perform any of the techniques described herein.

Figure 2A:
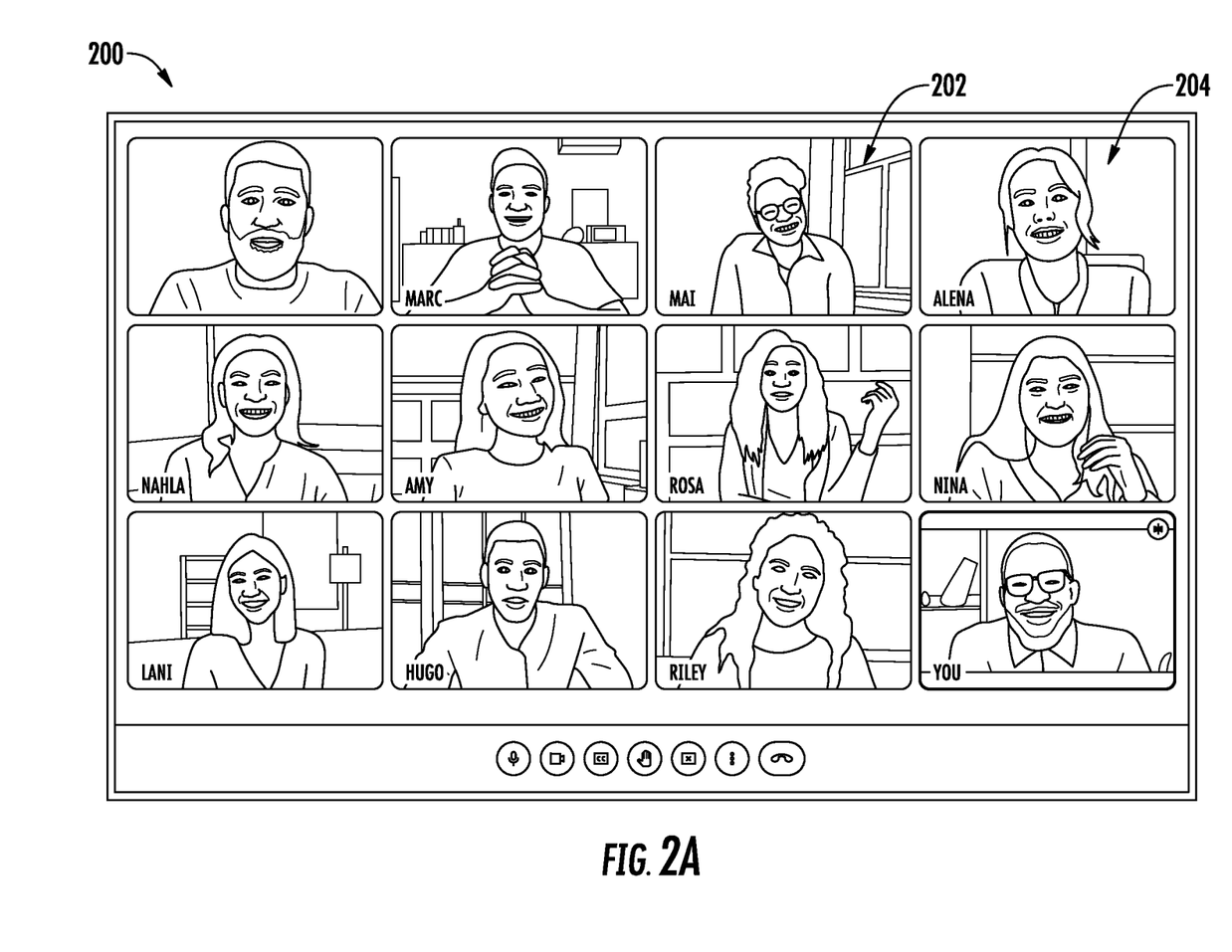
FIGS. 2A and 2B depict spatial audio modulation based on grouping of audiovisual streams according to example embodiments of the present disclosure.
Figure 2B:
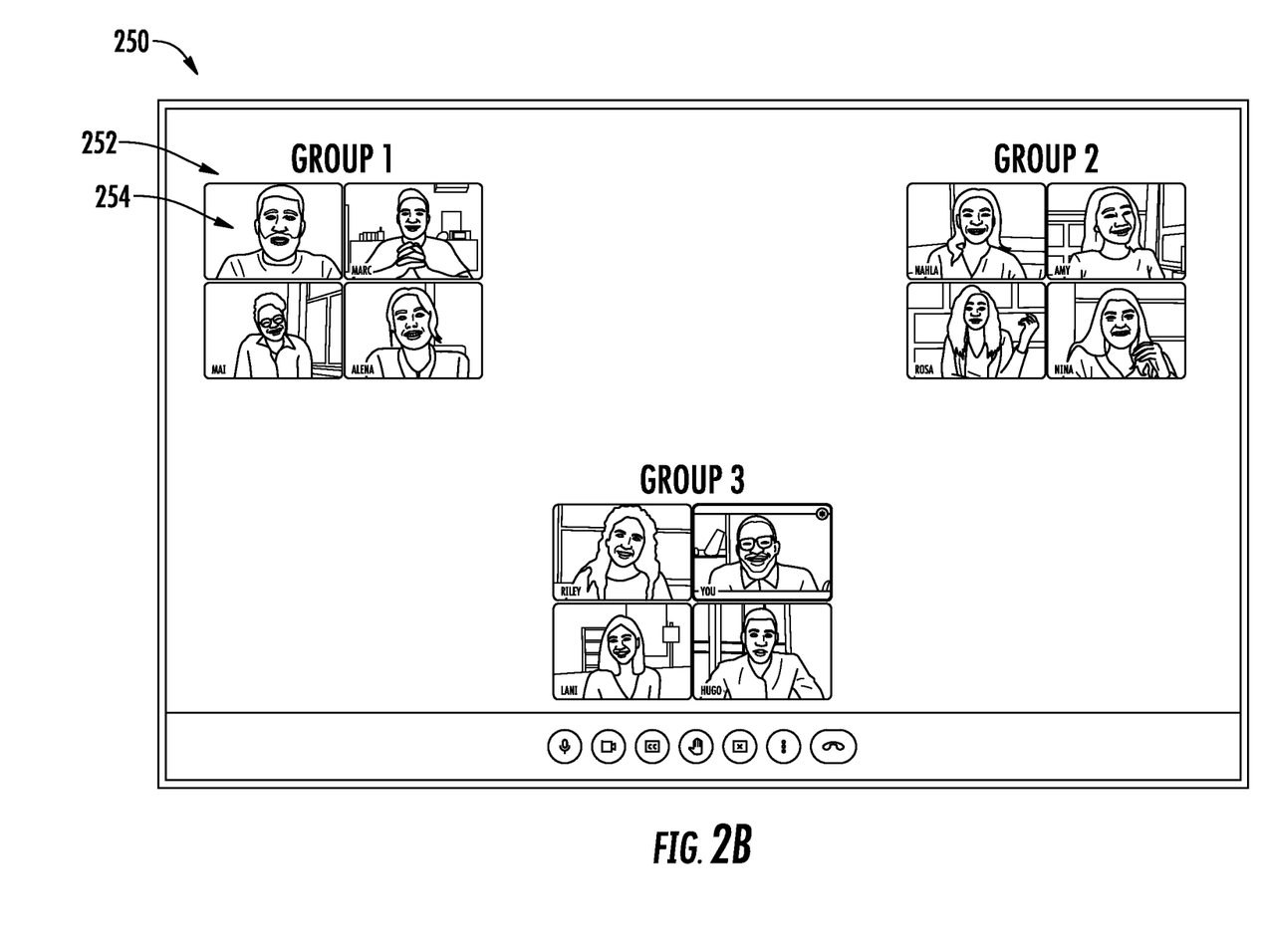

FIGS. 2A and 2B depict spatial audio modulation based on grouping of audiovisual streams according to example embodiments of the present disclosure. In particular, FIG. 2A shows a base user interface 200 for a video conference application. The user interface 200 displays visual data from a plurality of audiovisual streams respectively associated with a plurality of participants in a video conference. Each audiovisual stream can include audio data and visual data. In some implementations, some or all of the participants may be human participants. For example, the visual data can correspond to video that depicts the human participant while the audio data can correspond to audio captured in the environment in which the human participant is located. For example, regions 202 and 204 of the user interface correspond to video that depicts two different human participants of the video conference.

In some implementations, some of the participants (not shown) may correspond to content that is being shared among some or all of the other participants. For example, an audiovisual stream can correspond to a shared display or other shared content (e.g., shared by a specific human participant from their device or shared from a third-party source or integration). In another example, one audiovisual stream may correspond to multiple human participants (e.g., multiple humans located in a same room using one set of audiovisual equipment).

In some implementations, an audiovisual stream (e.g., a display stream shared by a participant) may include dynamic visual data while the audio data for the stream is null or blank. In other implementations, an audiovisual stream may include dynamic audio data while the visual data for the stream is null or blank (e.g., as in the case of a human participant who has their video "turned off"). Thus, as used herein, the term audiovisual stream generally refers to defined streams of content which can include audio and/or video. Multiple streams of content may originate from the same device (e.g., as in the case of a user having a first audiovisual stream for their video/audio presence and a second audiovisual stream which shares content from their device to the other participants).

In some implementations of the base user interface 200, playback of the audio data associated with the audiovisual streams can consistently come from a same virtual location on a soundstage (e.g., center-center). In other implementations of the base user interface 200, playback of audio data from each audiovisual stream can come from a respective virtual location that is correlated with the location of the corresponding visual data within the user interface 200 (e.g., playback of audio data associated with the visual data contained in region 204 may have a virtual location in the top-right of the soundstage.

According to an aspect of the present disclosure, the video conferencing system can determine a virtual audio location for each audiovisual stream within an audio soundstage based at least in part on the conferencing attribute determined for the audiovisual stream. The video conferencing system can modify the audio data associated with each audiovisual stream to cause playback of the audio data to have the virtual audio location within the audio soundstage that was determined for the audiovisual stream. The video conferencing system can then provide the plurality of audiovisual streams having the modified audio data for audiovisual playback in the video conference. This framework can be used to effectuate a number of different use-cases or example applications or user experiences.

Specifically, with reference now to FIG. 2B, in some implementations, the conferencing attribute determined for each audiovisual stream can be descriptive of assignment of each audiovisual stream to one of a plurality of different groupings of the plurality of audiovisual streams. For example, each audiovisual stream can be assigned (e.g., automatically and/or by a participant or moderator) to one of a number of different groups. Each group may be assigned a different virtual audio location in the audio soundstage. Then, the audio from any audiovisual stream can be modified so as to come from the virtual audio location assigned to the group in which the audiovisual stream is currently assigned/included. In such fashion, breakout rooms or multiple sub-meetings can occur within the same video conference, while different virtual audio locations are used to enable participants to distinguish among the audio (e.g., conversations) occurring in each sub-meeting. This example use may facilitate interactive events such as network events or causal get-togethers to occur in the same video conference, with users being able to move in and among different sub-meetings to join different discussions or conversations.

FIG. 2B illustrates an example user interface 250 in which the audiovisual streams have been assigned to groups. Specifically, simply as an example, three groups have been generated, with four audiovisual streams assigned to each group. Each group may be assigned a different virtual audio location in the audio soundstage. For example, group 252 may be assigned a virtual audio location in the top-left of the audio soundstage.

Then, the audio from any audiovisual stream can be modified so as to come from the virtual audio location assigned to the group in which the audiovisual stream is currently assigned/included. For example, playback of the audio from the audiovisual stream shown at 254 can come from the virtual location assigned to group 252.

Thus, spatial modulation of sound can be used to indicate group affiliation in the main call. For example, before or instead of breaking away from a larger video conference meeting into sub-meetings (breakout rooms), users can be grouped on the screen in different two-dimensional positions. The sound of users in that group can be modulated in three-dimensional space to come directly from that direction. This allows multiple groups to talk simultaneously, but users can easily distinguish and find their group on screen by following the modulated sound related to the screen-position of their group.

Figure 3:
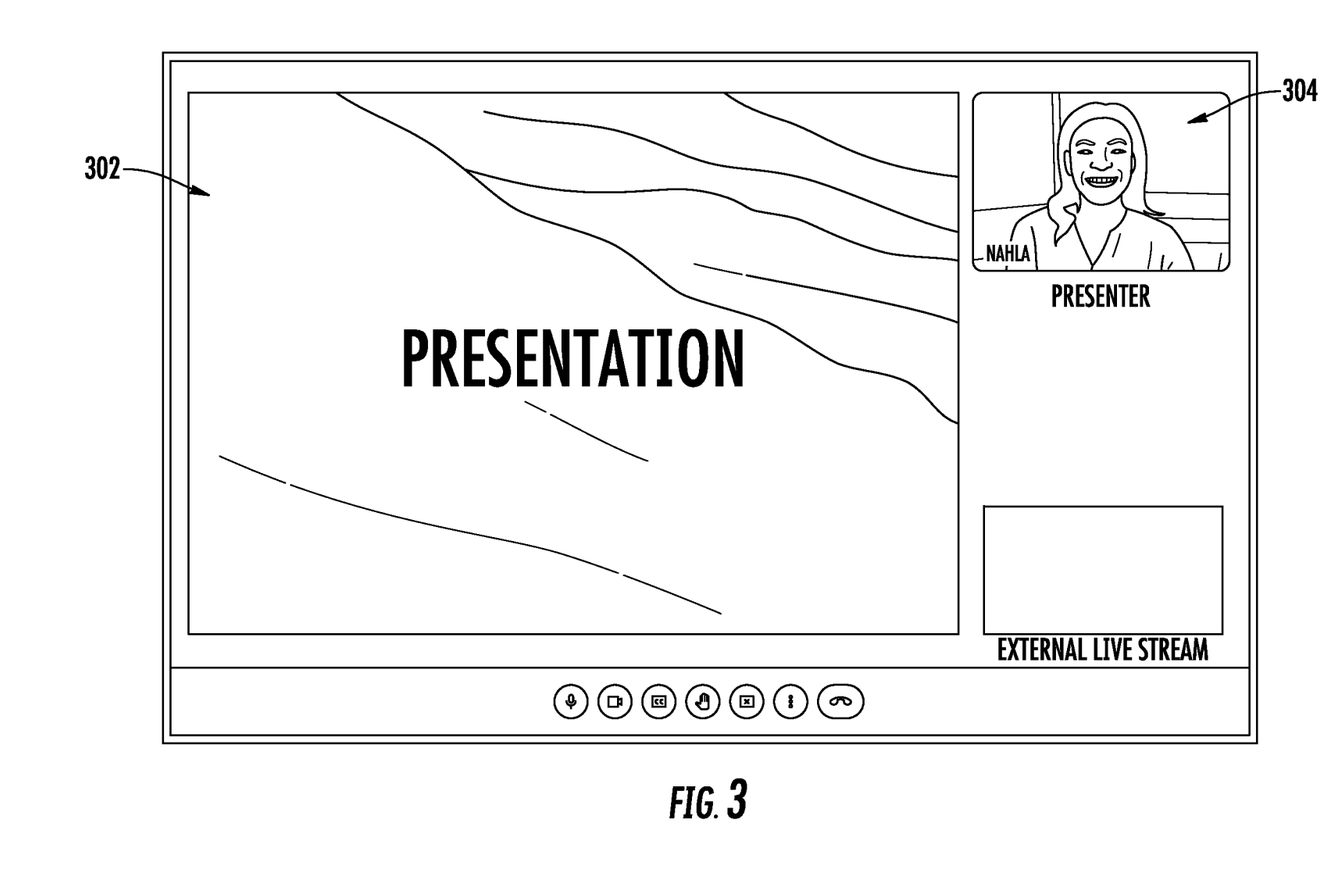
FIG. 3 depicts an example of spatial audio modulation based on content type of audiovisual streams according to example embodiments of the present disclosure.

As another example application, FIG. 3 depicts an example of spatial audio modulation based on content type of audiovisual streams according to example embodiments of the present disclosure. Specifically, in FIG. 3 audiovisual streams can be assigned (potentially among other possible designations) as a presentation content type and a presenter participant role. Thus, audio associated with the audiovisual stream 302 that has been determined to be a presentation content type can be modified so as to come from a certain virtual audio location associated with presentation content (e.g., center-left) while audio associated with an audiovisual stream that 304 has been determined to be a presenter participant role can be modified so as to come from a different virtual audio location associated with the presenter (e.g., top-right). Additionally, sound coming from another source, such as a live-stream from another event or platform that is being included in the video conference, could be modulated to come from the bottom-right.

Thus, spatial modulation of sound can be performed based on content type. This may have improved "accessibility" or other benefits for persons with disabilities. For example, when people present something in a video conference, the layout can be split: The presentation can be shown on one side (e.g., left), the presenter on the other (e.g., right), and the audience in a different position. To allow clear sound distinction, example implementations can modulate the sound of the presentation (e.g., a presented video) to come from a different direction than the presenter. Using spatial modulation, presenter and presented content can be separated audibly and can be mixed separately. For example, the video conference system can boost the presenter's voice while filtering harsh sounds from the presented material. The audience can be allocated yet another space in the 3D soundscape. Voice(s) belonging to people in this group can be modulated differently from presentation and presenter and are thus easy to identify. Thus, users can identify the content type through sound modulation. Users can focus their attention to a specific type of content, while still being able to listen to other content.

Figure 4:
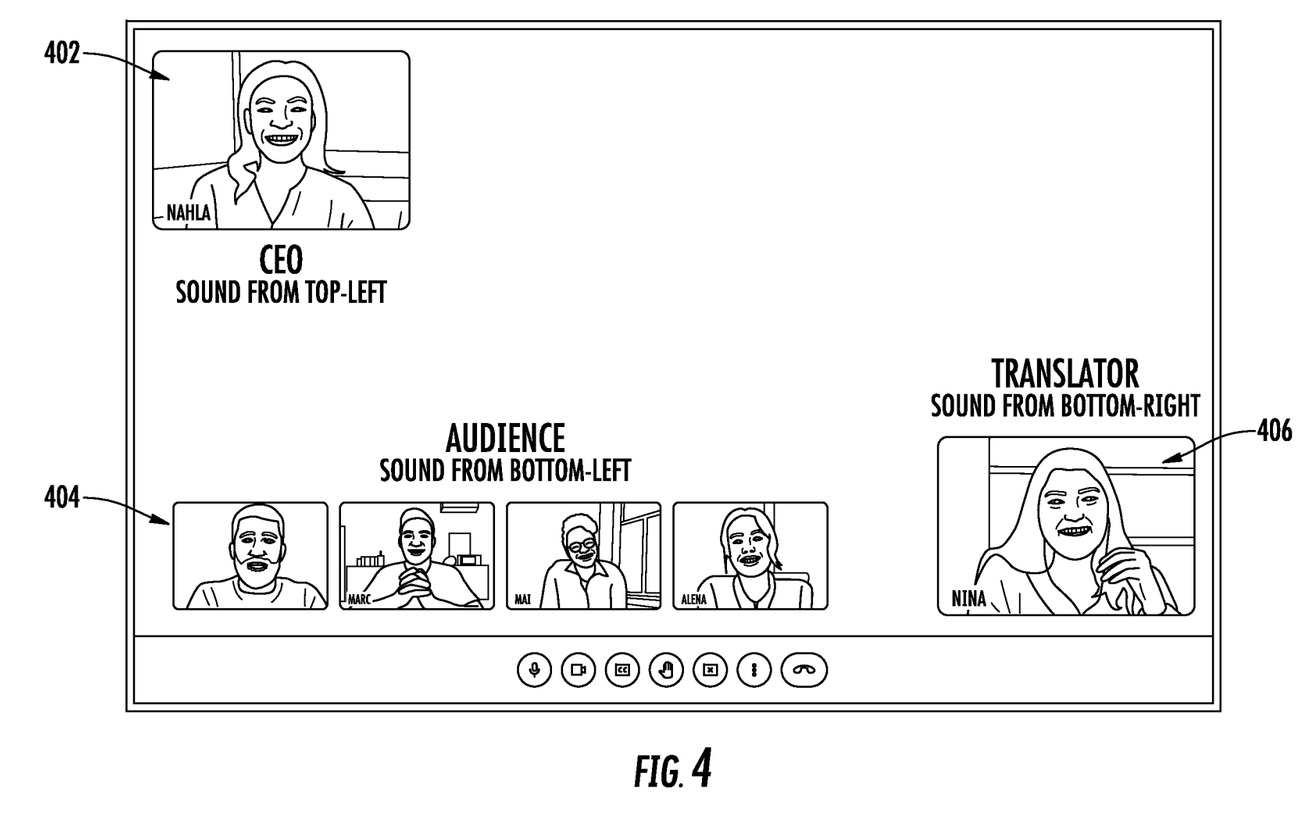
FIG. 4 depicts an example of spatial audio modulation based on participant role of audiovisual streams according to example embodiments of the present disclosure.

As another example application, FIG. 4 depicts an example of spatial audio modulation based on participant role of audiovisual streams according to example embodiments of the present disclosure. Specifically, in FIG. 4 audiovisual streams can be assigned (potentially among other possible designations) as a presenter participant role, an audience participant role, and a translator participant role. Thus, audio associated with the audiovisual stream 402 that has been determined to be a presenter role can be modified so as to come from a certain virtual audio location associated with presenters (e.g., top-left) while audio associated with an audiovisual stream 404 that has been determined to be an audience participant role can be modified so as to come from a different virtual audio location associated with the audience (e.g., bottom-left). Likewise, audio associated with the audiovisual stream 406 that has been determined to be a translator role can be modified so as to come from a certain virtual audio location associated with translators (e.g., bottom-right).

Thus, spatial modulation of sound can be performed based on participant role. This may have improved "accessibility" or other benefits for persons with disabilities. For example, a specific screen position can be reserved for one or more key persons in the meeting. These streams can then be associated with a two- or three-dimensional virtual sound position. Users with visual impairment will be able to distinguish their voice and can tell by the specific two- or three-dimensional audio coordinates that the person is important, for example that they are the presenter or CEO currently talking, without knowing their name via visual means.

Two- or three-dimensional sound modulation can be used to assign distinguishable roles to different types of video conference participants. As one example, sounds from the teacher in a classroom may always come from the top of the sound space while sound from the students may come from the bottom of the sound space. As another example, sound from people in a panel may always come from the top of the sound space while audience questions always come from the bottom of the sound space.

Figure 5:
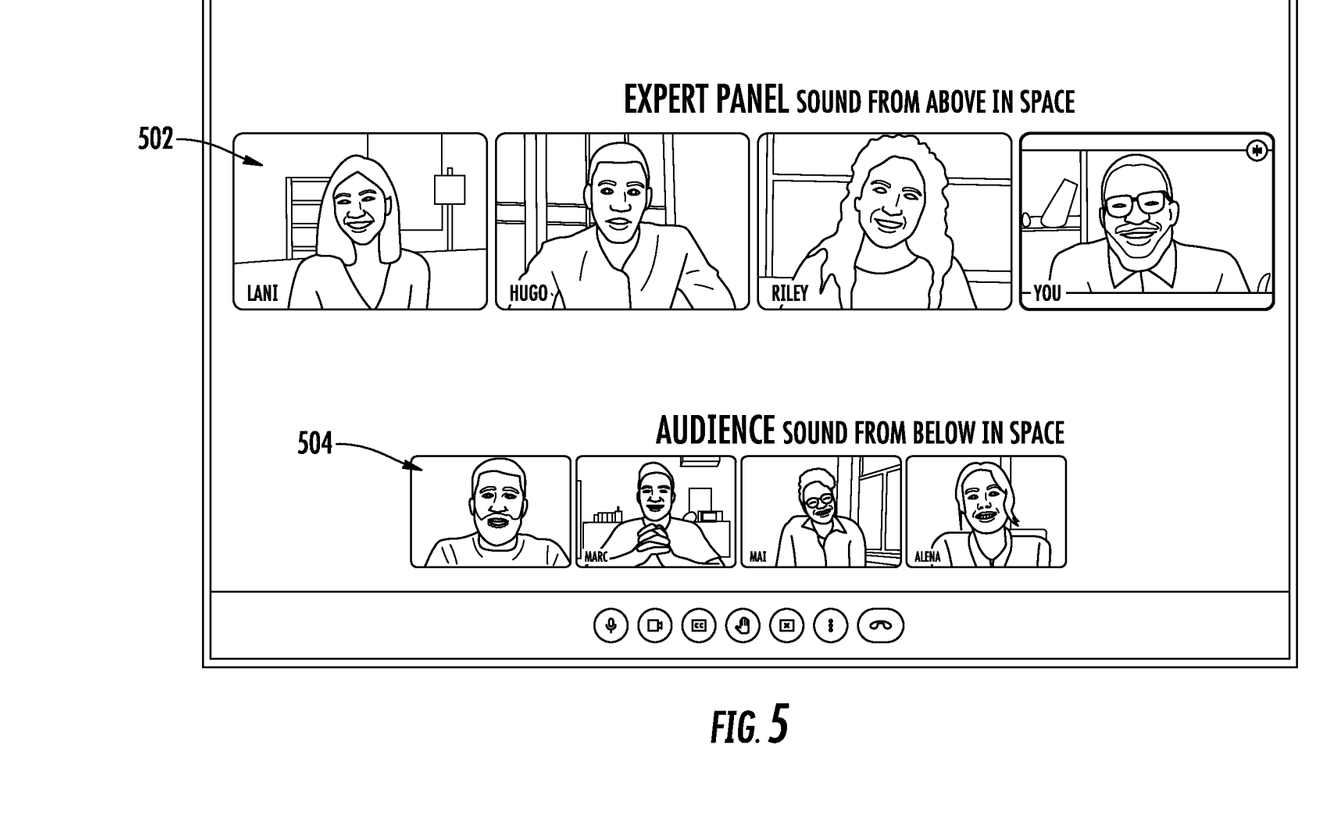
FIG. 5 depicts an example of spatial audio modulation based on participant role of audiovisual streams according to example embodiments of the present disclosure.

Thus, in some implementations, multiple audiovisual streams can be designated as presenter participant roles (e.g., when a "panel" of presenters is present). For example, this scenario is illustrated in FIG. 5 in which four streams (e.g., including stream 502) have been designated as an expert panel and all other audiovisual streams (e.g., including stream 504) have been placed associated to the group audience role.

Figure 6:
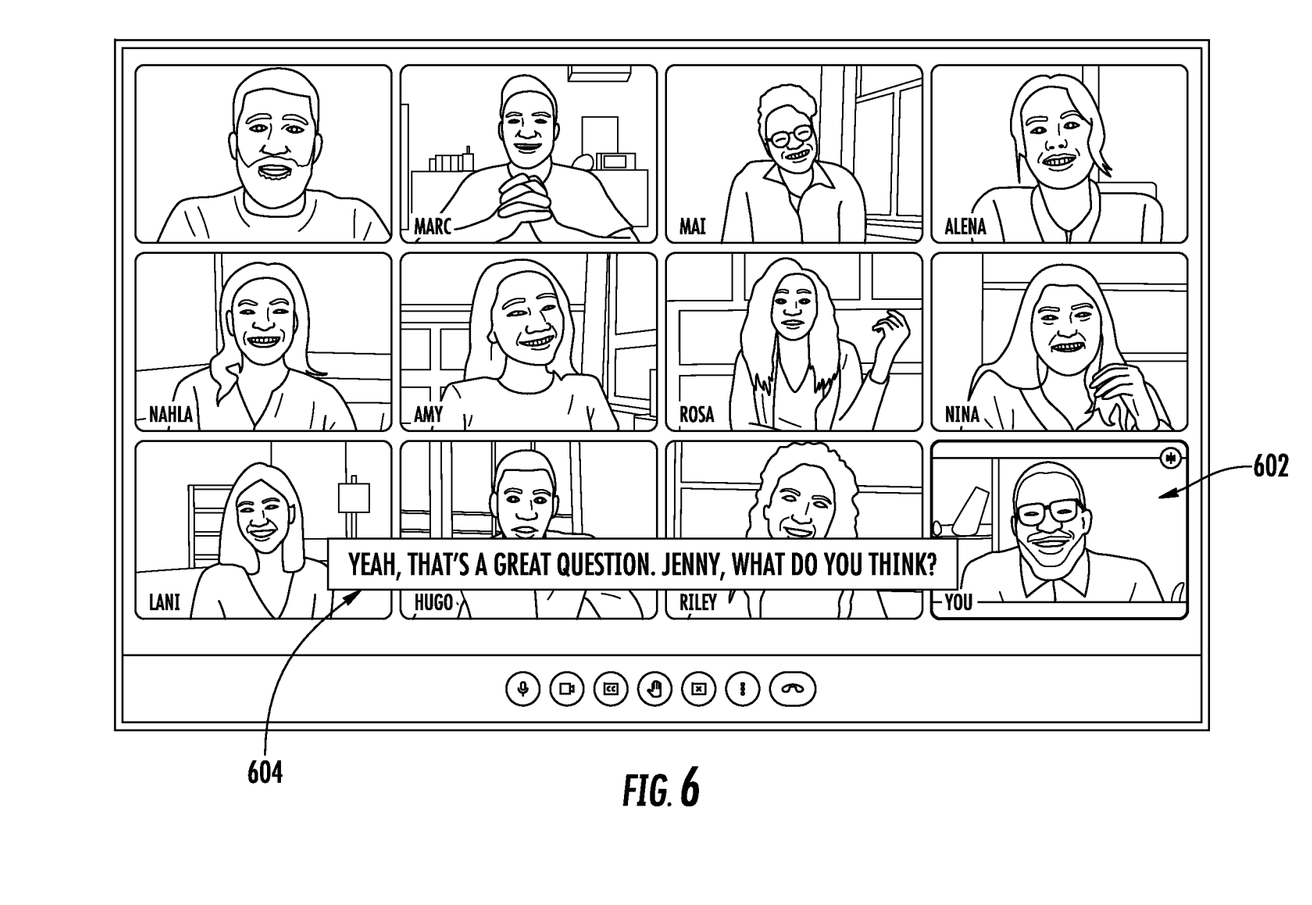
FIG. 6 depicts an example of spatial audio modulation based on content type of audiovisual streams according to example embodiments of the present disclosure.

As another example application, FIG. 6 depicts an example of spatial audio modulation based on content type of audiovisual streams according to example embodiments of the present disclosure. For example, predefined attribute values which can be assigned to audiovisual streams can include at least a captioned content type and a non-captioned content type. Thus, audio associated with an audiovisual stream that has been determined to be non-captioned audio can be left unmodified so as to come from the location that such audio would have otherwise been located at while audio associated with an audiovisual stream that has been determined to be captioned audio can be modified so as to come from a particular virtual audio location associated with captioned audio (e.g., bottom-center). For example, in FIG. 6, the audiovisual stream depicted in region 602 is being captioned (e.g., as shown by caption 604). Thus, audio from the audiovisual stream depicted in region 602 can be modified so that playback of the audio comes from a bottom-center virtual location on the soundstage (e.g., regardless of the visual location of the audiovisual stream depicted in region 602). In other implementations, captioned audio may be modulated to come from the location that it would have come from if it were not captioned.

Another example aspect of the present disclosure is directed to techniques to calibrate audio for a participant of a video conference. In particular, in one example, to calibrate audio for the participant, the video conferencing system can cause playback of audio data with an audio playback device while modifying a virtual audio location of the audio data within an audio soundstage. The system can receive input data provided by the participant of a video conference during modification of virtual audio location of the audio data within an audio soundstage and determine, based on the input data provided by the participant of the video conference, a physical location of the participant of the video conference relative to an audio playback device. The system can use the physical location of the participant of the video conference relative to an audio playback device to modify one or more other audio signals from other participants of the video conference to cause playback of the one or more other audio signals by the audio playback device to have a desired virtual location in an audio soundstage generated for the participant of the video conference during the video conference.

More particularly, users often do not sit in the center of their screen and it may not be a safe assumption that the user's audio playback device (speaker(s)) are placed in the same location as the display. Thus, example implementations can use three-dimensional sound panning to help the user position themselves correctly in front of the screen. The video conference system can pan sound in three-dimensions and the user can indicate where the sound is coming from. For example, the video conference system can spatially manipulate the sound in three-dimensions and then the user can indicate when or where the user felt that the audio was centrally located from the user's perspective.

The video conference system can evaluate the response and thus define the position of the user. The video conference system can use this information to modulate three-dimensional sound in the ensuing meeting. Using the three-dimensional sound manipulation, the user's position can be corrected. While the user may still sit in a different place, the video conference system can compensate for this by realigning the soundstage.

Another example aspect of the present disclosure is directed to techniques to make use signal processing techniques and to generate at least one feature parameter extracted from the audio data and/or the video data to determine the virtual audio location for the first audiovisual stream. In particular, in one example, to extract the feature parameter, the audio data and/or video data are processed by using signal processing techniques to generate the one or more feature parameters indicative of particular conferencing attributes, e.g. voice recognition techniques and/or image recognition techniques to identify the primary speaker in the respective audiovisual stream. According to this aspect, the conferencing attribute for the first audiovisual stream can thus directly be determined from the audio data and/or the video data of the first audio stream. The first virtual audio location for the first audiovisual stream can then be determined by evaluating the at least one feature parameter based on the result of the feature parameter evaluation. For example, if according to the extracted feature parameter, the primary speaker is identified as the presenter 304 of the presentation 302, the first virtual audio location will be determined to come from the top-right location in FIG. 3. In order to modify the audio data associated with the first audiovisual stream to cause playback of the audio data to have the first virtual audio location within the audio soundstage, a location characteristic is provided to the audio data associated with the first audiovisual stream based on the first virtual audio location. For example, the audio data are transformed using signal processing techniques to provide the virtual audio location to the audio data of the first audiovisual stream so that during playback the listener experiences that the first audiovisual stream comes from the first virtual audio location.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for providing spatial audio within a videoconferencing application, the method comprising:
    receiving, by a computing system comprising one or more computing devices, a plurality of audiovisual streams respectively associated with a plurality of participants in a video conference, wherein each audiovisual stream comprises audio data and visual data;
    for at least a first audiovisual stream of the plurality of audiovisual streams:
        determining, by the computing system, a conferencing attribute for the first audiovisual stream, wherein the conferencing attribute is descriptive of one or both of: a content type associated with the first audiovisual stream or a participant role associated with the first audiovisual stream;
        determining, by the computing system, a first virtual audio location for the first audiovisual stream within an audio soundstage based at least in part on the conferencing attribute; and
        modifying, by the computing system, the audio data associated with the first audiovisual stream to cause playback of the audio data to have the first virtual audio location within the audio soundstage; and
    providing, by the computing system, the plurality of audiovisual streams including the first audiovisual stream having the modified audio data for audiovisual playback in the video conference.

2. The computer-implemented method of claim 1, wherein:
    the conferencing attribute comprises one of a plurality of predefined attribute values; and
    the plurality of predefined attribute values comprise at least a presentation content type and a presenter participant role.

3. The computer-implemented method of claim 1, wherein:
    the conferencing attribute comprises one of a plurality of predefined attribute values; and
    the plurality of predefined attribute values comprise at least a presenter participant role and an audience participant role.

4. The computer-implemented method of claim 1, wherein:
    the conferencing attribute comprises one of a plurality of predefined attribute values; and
    the plurality of predefined attribute values comprise at least a primary speaker participant role and a translator participant role.

5. The computer-implemented method of claim 1, wherein:
    the conferencing attribute comprises one of a plurality of predefined attribute values; and
    the plurality of predefined attribute values comprise at least a captioned content type and a non-captioned content type.

6. The computer-implemented method of claim 1, wherein the conferencing attribute is descriptive of assignment of the first audiovisual stream to one of a plurality of different groupings of the plurality of audiovisual streams.

7. The computer-implemented method of claim 1, wherein the conferencing attribute is dynamic and manually controllable by a moderator of the video conference.

8. The computer-implemented method of claim 1, wherein the conferencing attribute for the first audiovisual stream is specific to each participant and manually controllable by each participant of the video conference.

9. The computer-implemented method of claim 1, wherein the conference attribute for the first audiovisual stream is defined within a calendar invitation associated with the video conference.

10. The computer-implemented method of claim 1, wherein:
    the conferencing attribute comprises one of a plurality of predefined attribute values; and
    the plurality of predefined attribute values are associated with and a function of a predefined template layout selected for the video conference.

11. The computer-implemented method of claim 1, wherein determining, by the computing system, the conferencing attribute for the first audiovisual stream comprises automatically determining, by the computing system, the conferencing attribute for the first audiovisual stream.

12. The computer-implemented method of claim 11, wherein automatically determining, by the computing system, the conferencing attribute for the first audiovisual stream comprise:
recognizing, by the computing system, text in visual data included in one of the audiovisual streams;
performing, by the computing system, speech-to-text to generate text from audio data included in another of the audiovisual streams; and
identifying, by the computing system, the another of the audiovisual streams when the text generated from audio data matches the text in the visual data.

13. The computer-implemented method of claim 1, wherein:
determining, by the computing system, the first virtual audio location for the first audiovisual stream within the audio soundstage based at least in part on the conferencing attribute comprises determining, by the computing system, both the first virtual audio location and a second virtual audio location for the first audiovisual stream within the audio soundstage based at least in part on the conferencing attribute; and
modifying, by the computing system, the audio data associated with the first audiovisual stream to cause playback of the audio data to have the first virtual audio location within the audio soundstage comprises:
performing, by the computing system, source separation on the audio data associated with the first audiovisual stream to separate the audio data into first source audio data from a first audio source and second source audio data from a second audio source;
modifying, by the computing system, the first source audio data to cause playback of the first source audio data to have the first virtual audio location within the audio soundstage; and
modifying, by the computing system, the second source audio data to cause playback of the second source audio data to have the second virtual audio location within the audio soundstage.

14. The computer-implemented method of claim 1, wherein the first virtual audio location of the first audiovisual stream is decorrelated with a video location of the first audiovisual stream.

15. The computer-implemented method of claim 1, wherein the computing system consists of a server computing system and the computer-implemented method is performed at the server computing system.

16. The computer-implemented method of claim 1, wherein the computing system consists of a client computing device associated with one of the participants and the computer-implemented method is performed at the client computing device.

17. A computing system, comprising:
one or more processors; and
one or more non-transitory, computer-readable media that store instructions that when executed by the one or more processors cause the computing system to perform operations, the operations comprising:
receiving, by the computing system, a plurality of audiovisual streams respectively associated with a plurality of participants in a video conference, wherein each audiovisual stream comprises audio data and visual data;
for at least a first audiovisual stream of the plurality of audiovisual streams:
determining, by the computing system, a conferencing attribute for the first audiovisual stream, wherein the conferencing attribute is descriptive of one or both of: a content type associated with the first audiovisual stream or a participant role associated with the first audiovisual stream;
determining, by the computing system, a first virtual audio location for the first audiovisual stream within an audio soundstage based at least in part on the conferencing attribute; and
modifying, by the computing system, the audio data associated with the first audiovisual stream to cause playback of the audio data to have the first virtual audio location within the audio soundstage; and
providing, by the computing system, the plurality of audiovisual streams including the first audiovisual stream having the modified audio data for audiovisual playback in the video conference.

18. The computing system of claim 17, wherein:
the conferencing attribute comprises one of a plurality of predefined attribute values; and
the plurality of predefined attribute values comprise:
a presentation content type;
a presenter participant role;
an audience participant role;
a primary speaker participant role;
a translator participant role;
a captioned content type; or
a non-captioned content type.

19. The computing system of claim 17, wherein the conferencing attribute is descriptive of assignment of the first audiovisual stream to one of a plurality of different groupings of the plurality of audiovisual streams.

20. One or more non-transitory computer-readable media that store instructions that, when executed by one or more processors of a computing system, cause the computing system to perform operations to calibrate audio for a participant of a video conference, the operations comprising:
causing playback of audio data with an audio playback device while modifying a virtual audio location of the audio data within an audio soundstage;
receiving input data provided by the participant of a video conference during modification of virtual audio location of the audio data within an audio soundstage;
determining, based on the input data provided by the participant of the video conference, a physical location of the participant of the video conference relative to an audio playback device; and
using the physical location of the participant of the video conference relative to an audio playback device to modify one or more other audio signals from other participants of the video conference to cause playback of the one or more other audio signals by the audio playback device to have a desired virtual location in an audio soundstage generated for the participant of the video conference during the video conference.

* * * * *